(12) United States Patent
Ottavi et al.

(10) Patent No.: US 8,448,131 B2
(45) Date of Patent: May 21, 2013

(54) TEST DATA CREATION AND EXECUTION SYSTEM FOR SERVICE ORIENTED ARCHITECTURE

(75) Inventors: Adriano Ottavi, San Mariano (IT); Stefano Cappilli, Milan (IT); Alberto Montanari, Mantova (IT)

(73) Assignee: Accenture Global Services Limited, Dublin (IE)

( * ) Notice: Subject to any disclaimer, the term of this patent is extended or adjusted under 35 U.S.C. 154(b) by 1092 days.

(21) Appl. No.: 12/269,587

(22) Filed: Nov. 12, 2008

(65) Prior Publication Data

US 2010/0095276 A1 Apr. 15, 2010

(30) Foreign Application Priority Data

Oct. 9, 2008 (EP) .................................. 08 425 658

(51) Int. Cl.
*G06F 9/44* (2006.01)
(52) U.S. Cl.
USPC ........................................................ 717/104
(58) Field of Classification Search
USPC ........................................................ 717/104
See application file for complete search history.

(56) References Cited

U.S. PATENT DOCUMENTS

| 7,028,223 | B1 * | 4/2006 | Kolawa et al. | 714/37 |
| 7,150,007 | B2 | 12/2006 | Ionescu | |
| 7,992,133 | B1 * | 8/2011 | Theroux et al. | 717/124 |
| 2004/0117759 | A1 | 6/2004 | Rippert, Jr. et al. | |
| 2004/0199818 | A1 | 10/2004 | Boilen et al. | |
| 2008/0059558 | A1 | 3/2008 | Singh et al. | |

FOREIGN PATENT DOCUMENTS

| EP | 2 175 373 A1 | 4/2010 |
| WO | WO 02/075610 A1 | 9/2002 |

OTHER PUBLICATIONS

Communication from the European Patent Office for EPO Application No. 08425658.5 dated Mar. 17, 2010.
Communication from the Canadian Patent Office for Canadian Patent Application No. 2,681,289 dated Feb. 28, 2012.
Notification of 2$^{nd}$ Office Action dated Feb. 28, 2012 for co-pending Chinese Patent Application No. 200910177793.3.
European Patent Office Communication dated Mar. 12, 2009 for co-pending European Patent Application No. 08425658.5.
Papazoglou et al., "Service Oriented Architecture: Approaches, Technologies and Research Issues," The VLDB Journal, published online Mar. 3, 2007, pp. 389-415.
Notification of the Third Office Action dated Aug. 1, 2012 for co-pending Chinese Patent Application No. 200910177793.3 with English translation (15 pp.).

* cited by examiner

*Primary Examiner* — Li B Zhen
*Assistant Examiner* — Bradford Wheaton
(74) *Attorney, Agent, or Firm* — Brinks Hofer Gilson & Lione

(57) ABSTRACT

A test data creation and execution system provides an efficient way to dramatically improve testing of web service based applications. The test data creation and execution system assists testers in identifying and executing various combinations of unit tests, as well as integration and regression testing of web services and methods of web services. The test data creation and execution system provides testers the functionality to rapidly produce high quality web services based applications.

20 Claims, 10 Drawing Sheets

TEST DATA CREATION AND EXECUTION SYSTEM FOR SERVICE ORIENTED ARCHITECTURE

PRIORITY CLAIM

This application claims the benefit of priority to EPO application Ser. No. 08425658.5, filed on Oct. 9, 2008.

BACKGROUND OF THE INVENTION

1. Technical Field

This disclosure concerns improving application testing of web service based applications. In particular, this disclosure relates to efficiently identifying test permutations, and initiating execution of unit, integration, regression and performance testing of web services and the methods of web services, in order to rapidly produce high quality web service based applications.

2. Background Information

Organizations continually face the challenges of developing new applications and enhancing existing applications in order to remain competitive. Accurate and thorough testing is a critical factor to producing high quality applications. The difficultly and effort of conducting proper application testing is highly dependent upon the number and complexity of the applications and the business processes the applications are designed to model.

Many of the applications in operation and being developed today are web services based applications deployed in open architectures such as Service Oriented Architecture (SOA). Although web services provide developers the flexibility to rapidly model and deploy complex business processes, development tools currently available to properly test web services and underlying methods of web services provide limited capabilities. A complex web service may enlist any number of web service methods to carryout the business processes modelled by the web service. A tester may need to develop countless test cases in order to properly exercise all the possible operational permutations that the web service methods of a web service may be designed to handle.

Successful unit testing of a web service method and/or web service provides little indication as to the quality and operational integrity of the web service method and web service once deployed into production. Moreover, the quality of integration testing may only be as good as the underlying unit tests performed. The inadequacy of certain integration tests may not even be recognized as such by currently available testing tools. The vast number of test cases that must be identified and/or developed to ensure the quality and operational integrity of web service methods and web services impose significant time commitments on developers and testers. Testers often waste valuable development time reusing outdated tests and developing duplicate tests without realizing such flawed approaches.

SUMMARY

The test data creation and execution system for a service oriented architecture ("test execution system") provides an efficient and cost effective way to dramatically improve the testing of web service based applications. The test execution system provides a way to rapidly develop and execute vast numbers of permutations of unit test conditions. The test execution system also provides regression testing capabilities that can be executed regularly before releasing an application so that fixes and new capabilities may be quickly and efficiently certified, and impacts to already deployed functionality and previously tested functionality may be minimized. The test execution system further provides test execution performance metrics that may be used to identify bottlenecks that occur during the execution particular web services and web service methods.

The test execution system includes a storage system that adheres to a standardized project area specification for a project area structure. The standardized project area specification includes a standardized test directory naming convention and a standardized test file naming convention. The memory of the test execution system includes project area management logic that locates the project area structure on the storage system and parses the project area structure to determine project areas within the project area structure and test environment areas within the project areas, web service areas within the test environment areas, and web service method areas within the web service areas. The memory of the test execution system further includes graphical user interface (GUI) logic that presents a test object selection interface comprising object selectors, including: a project area selector populated with project areas; a test environment selector populated with the test environment areas; a web service selector populated with the web service areas; and a method selector populated with the web service method areas.

The GUI logic obtains a method selection selected using the method selector, and specifies the method selection to the project area management logic, and receives in response a method test list comprising individual method tests for the method selection. The GUI logic determines a method test to execute comprising a pre-configured selection of method tests from the method test list and initiates execution of the method test to obtain method test results stored in a test results area within the project area structure. The test execution system further comprises a processor coupled to the memory and the storage system, and the processor executes the project area management logic and the GUI logic.

In one implementation, the GUI logic obtains an object selection selected using the object selectors, and specifies the object selection to the project area management logic, and receives in response an object test list comprising object tests for the object selection. The object selection may represent any combination of selections from the object selectors. The GUI logic determines an object test to execute comprising a pre-configured selection of object tests from the object test list and initiates execution of the object test to obtain object test results stored in a test results area within the project area structure.

Other systems, methods, products and features of the invention will be, or will become, apparent to one with skill in the art, upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1:
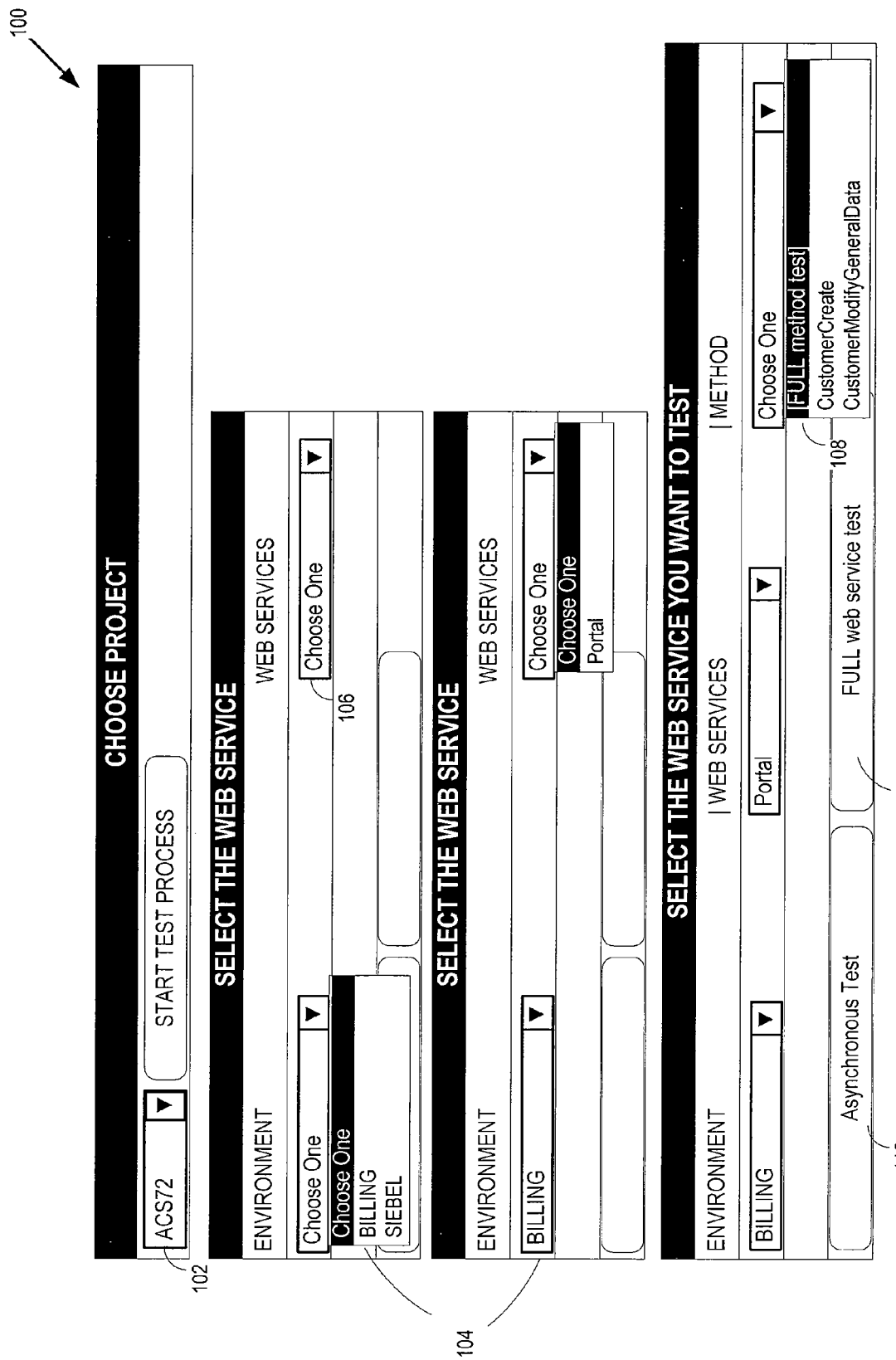
FIG. 1 illustrates a test object selection interface of the test execution system used to navigate a project area structure.

The test execution system leverages tests developed by testers to unit test web service methods and web services so that any number of unit test permutations and integration tests may be rapidly developed and executed. The test execution system may employ a pre-configuration phase and post-configuration phase. During the pre-configuration phase: 1) a project area is created in a project area structure in accordance with a standardized project area specification, 2) a test is developed for a web service method and/or web service, 3) the test is named in accordance with the standardized project area specification, and 4) the test is stored in the project area structure. The standardized project area specification defines a standardized test directory naming convention and standardized test file naming convention used to manage and store tests and results in the project area structure.

In one implementation, the test execution system works with the web service definition language (WSDL). The WSDL is an XML-based language that provides a model for describing web services and web service methods, and how to access the web services and web service methods. The WSDL defines services (e.g., web services) as collections of network endpoints (e.g., ports) and identifies XML schema definition language (XSD) schemas that define valid request messages and response messages used to communicate with web service methods. A XSD schema establishes a structure that includes a series of rules and constraints to which a request message and/or response message (e.g., XML document instance) must comply in order for parsers and processors to deem the request message and/or response message valid. The test execution system may use the XSD schemas to validate the tests (e.g., response messages and request messages) and the validation results (e.g., test results) capture detailed information used to analyze and refine the web service methods, web services and tests. In other implementations, however, the test execution system may use other models, languages, or validation rule sets for defining web services and web service methods. Furthermore, the test execution system may be applied to other types of environments other that the web service environment. Thus, when other types of programs or systems need to be tested, the test execution system may nevertheless define project areas and project area specifications, and work with tests that comply with the project area specification and chosen to meet selected testing goals for the other types of programs and systems.

The test execution system provides a project area structure used to maintain: 1) XSD schema files (e.g., filename extension .xsd) used to validate request messages and response messages (e.g., tests); 2) request messages and response messages (e.g., filename extension .xml), which may be considered instances of their XSD schemas; 3) WSDL files that describe the web services and how to access the web services of the application to be tested using the test execution system; and 4) test results (e.g., filename extension .txt) that capture detailed information regarding the validation of the request messages and response messages used to test a web service method and the web service.

During the pre-configuration phase, a tester analyzes the WSDL file of each web service to be tested, identifies the web service methods for each web service so that tests may be created, and creates XSD schema files (e.g., schema_methodName_000x.xsd) that define valid request messages and response messages (e.g., tests) for each web service method. A request message calls a method of a service provider (e.g., web service method getBalanceInquiry) in accordance with a WSDL file of the service provider (e.g., a web service responsive to the request message). A web service method responsive to a particular request message may return a response message, wherein each message has a respective XSD schema. XSD schemas may define multiple relationships between the XSD schemas. For example, a XSD schema for a getBalanceInquiry request may define relationships with multiple XSD schemas responsive to the request (e.g., getBalanceInquiryResponse and BalanceInquiryResponse).

The tester may verify the XSD schema files and build tests (e.g., request messages and response messages) using available XML development tools (e.g., the XmlSpy® tool). For example, a XML development tool may be used to create requests messages and responses messages (e.g., XML documents) based on the created XSD schema files (e.g., schema_methodName_000x.xsd). The request messages may be used to invoke the web service methods of the WSDL. Response messages produced by a WSDL (e.g., WebServiceName.wsdl file) in response to a request message may be compared and validated with the response messages created by the XML development tool.

During the post-configuration phase, the test execution system provides the tester the ability to 1) navigate the project area to identify one or more tests created and/or used by any number of testers, 2) refine and combine unit tests to produce various permutations of unit, integration, regression and asynchronous tests, 3) execute selected tests and 4) view test results so that the web service methods, web services and tests may be iteratively refined to produce high quality applications.

FIG. 1 illustrates a test object selection interface 100 of the test execution system. A tester may use the test object selection interface 100 to navigate a project area structure. As described in more detail below, the test execution system includes project area management logic that locates the project area structure on a storage system and parses the project area structure to determine project areas within the project area structure, test environment areas within the project areas, web service areas within the test environment areas, and web service method areas within the web service areas. The project area management logic may parse the project area structure to determine any number of areas and objects (e.g., files) within and/or referred to by the project area structure.

The test execution system includes GUI logic that presents the test object selection interface 100. The test object selection interface 100 includes object selectors, including: a project area selector 102 that the project area management logic populates with project areas; a test environment selector 104 that the project area management logic populates with test environment areas within respective project areas; a web service selector 106 that the project area management logic populates with web services areas within respective test environment areas; and a method selector 108 that the project area management logic populates with web service method areas within respective web services areas. The object selectors may further include an asynchronous test selector 110 and a full web service test selector 112, discussed below.

The tester navigates the project area structure using the test object selection interface 100 to identify tests to execute. The GUI logic obtains an object selection selected using the object selectors (e.g., a method selection), and specifies the object selection to the project area management logic. The GUI logic receives in response an object test list comprising object tests for the object selection (e.g., a method test list comprising individual method tests for the method selection). The object selection may represent any combination of selections from the object selectors (e.g., a project area selection, a test environment area selection, a web service area selection, a web service method area selection, an asynchronous test selection and a full web service test selection). In one implementation, the test object selection interface 100 includes an add test menu selector that identifies an additional object test to add to the object test list; and a delete test menu selector that identifies a deletable object test to delete from the object test list.

In FIG. 1, the tester has selected the ACS72 project area from the project areas selector 102. The project area management logic populates the project areas selector 102 with the projects areas found by the project area management logic upon parsing the project area structure. The project area selector 102 may be populated with any number of project areas from which to select. Once the ACS72 project area has been selected, the GUI logic obtains the selection and the project area management logic parses the ACS72 project area in order to populate the test environment area selector 104 with test environment areas shown in the drop down. In FIG. 1, the tester has selected the Billing test environment area from the test environment area selector 104. Although FIG. 1 illustrates an implementation of the Billing test environment that includes one web service area (e.g., the Portal web service area), a test environment area (e.g., other implementations of the Billing test environment area) may include multiple web service areas that the project area management logic would otherwise find upon parsing the test environment area with which to populate the web service areas selector 106. Once the tester selects the Portal web services area the project area management logic parses the Portal web services area and populates the method selector 108 with the web service method areas found within the Portal web service area.

Figure 3:
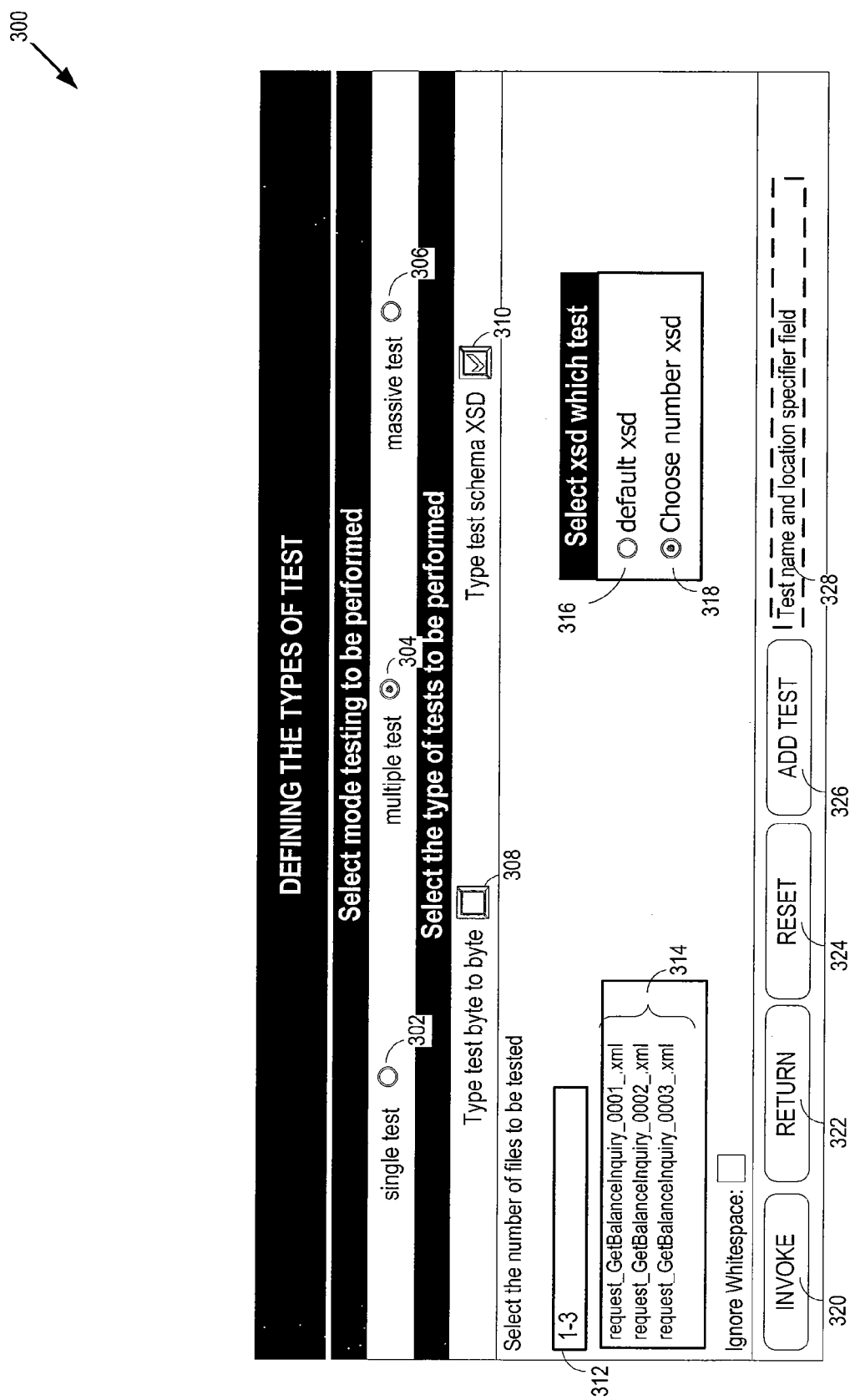
FIG. 3 illustrates a test type selector presented by the test object selection interface.

In particular, FIG. 1 shows the method selector 108 populated with a composite web service method area named 'full method test' for the 'Portal' web service area, as well as multiple individual web service method areas, such as CustomerCreate and CustomerModifyGeneralData. The composite 'full method test' web service method area is a shorthand reference to the multiple individual web service method areas and the tests that those web service method areas include for a web service area. In the event the tester selects the composite 'full method test' web service method area, the tester may then select the full web service test selector 112 to initiate execution of the tests for all the methods for the web service Portal. In one implementation, when the tester selects an individual web service method area from the method selector 108 (e.g., CustomerCreate web service method area), the test object selection interface 100 presents the test type selector, as shown in FIG. 3, so that the tester may further refine the tests to be performed. A composite web service method area may represent any number of individual method tests, and the method test selector 108 may display any number of composite web service method areas from which to choose.

In another implementation, when the tester selects a project area, test environment area, and/or web service area, and selects the asynchronous test selector 110 or the full web service test selector 112, then the test object selection interface 100 presents the test type selector 300 described below. For example, in the event a tester desires to test all the web service methods for a particular project area, the tester selects the desired project area, without selecting a test environment area, a web service area and web service method area, and the tester then selects either the asynchronous test selector 110 or the full web service test selector 112, and the test object selection interface 100 presents the test type selector 300. In the event a tester desires to test all the web service methods for a particular test environment area, the tester selects the desired project area and a test environment area, without selecting a web service area and web service method area, and the tester selects either the asynchronous test selector 110 or the full web service test selector 112, and the test object selection interface 100 presents the test type selector 300.

Figure 2:
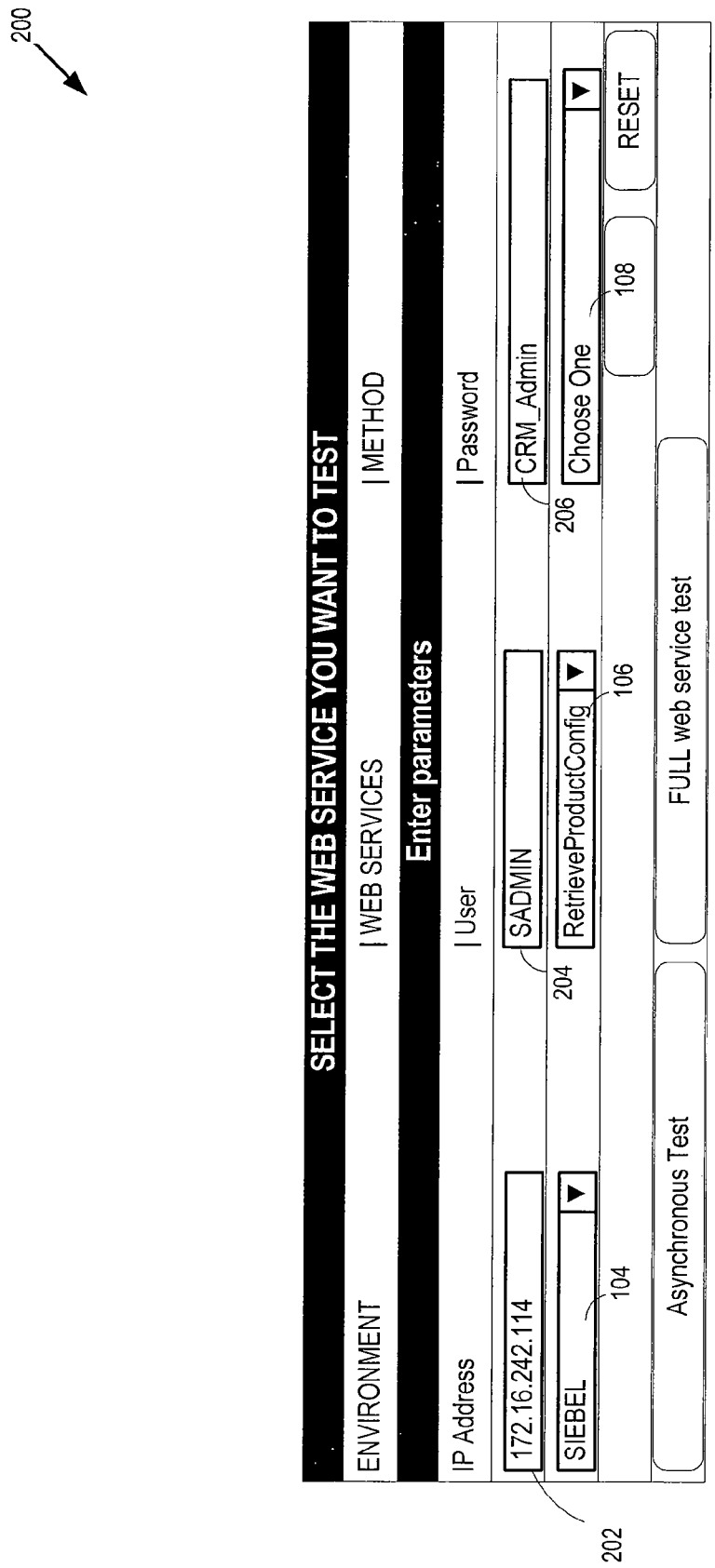
FIG. 2 illustrates a user credential management interface for a test environment area selection.

FIG. 2 illustrates a user credential management interface 200 for a test environment area selection that the test object selection interface 100 may present to a tester. The test object selection interface 100 may present the user credential management interface 200 to a tester based on the selection of a particular project area from the project area selector 102 and test environment area from the test environment area selector. A tester may enter user credential management parameter values into the user credential management interface 200. In one implementation, valid user credential management parameter values must be entered before navigating to and selecting from the web service selector 106 and method selector 108. The user credential management parameters for which user credential management parameter values are required may include: an IP address parameter 202 that identifies the test environment by IP address (e.g., 123.45.678.123) rather than by the test environment name identified by the test environment area (e.g., Billing test environment area); username parameter 204; and password parameter 206. More, fewer and different combinations of user credential management parameters may be presented in the user credential management interface 200 based on based on the selection of a particular project area and test environment area. Authentication and/or authorization may be applied at any level of the test object selection so that user credential management parameters may be required before a test object selector is populated with selections. The user credential management interface 200 provides user authentication so that unauthorized access to particular project areas, test environment areas, web service areas and web service method areas can be prevented and the integrity of the tests available to testers preserved.

FIG. 3 illustrates a test type selector 300 presented by the test object selection interface 100. When the tester selects a project area, test environment area, and/or web service area, and selects the asynchronous test selector 110, or the full web service test selector 112, or a web service method area, then the test object selection interface 100 presents the test type selector 300. The test type selector 300 includes test mode selectors (e.g., single test 302, multiple test 304, and massive test 306), and type of test selectors (e.g., type test byte-to-byte 308 and type test schema XSD 310). In the event a tester selects the single test 302 mode, the test type selector 300 presents a list of tests in the test list interface 314 (e.g., request messages) from which the tester may select a single test case to execute. The project area management logic may populate the test list interface 314 with tests (e.g., request_GetBalanceInquiry_0001.xml, 0002.xml and 0003.xml) located in a web service method area (e.g., GetBalanceInquiry) within a web service area (e.g., Portal) of a test environment area (e.g., Billing) of a project area (e.g., ACS72) identified by the object selections selected by the tester using the test object selection interface 100.

In the event the tester selects the multiple test 304 mode selector, the test type selector 300 may present the selector entry field 312 for selecting the number of the files to be tested and may display the applicable tests in the test list interface 314. The tester enters the numbers of the test cases shown in the test list interface 314 that the tester desires the test execution system to execute. The tester may further indicate a range of test cases (e.g., 1-3) or a list of test cases separated by commas (e.g., 1, 2, 3) to execute. Other test selection mechanisms may be employed, such as accepting a multi-selection of entries directly from the test list interface 314.

The tester may further select whether to validate the results against a default XSD file by selecting the default XSD 316 or specific XSD schema by selecting the 'choose number XSD' 318. In other words, the tester may desire to validate the test results (e.g., response_GetBalanceInquiry_0001.xml, 0002.xml and 0003.xml) using a particular default XSD schema file or the tester may choose to use specific XSD schema files (e.g., response_GetBalanceInquiry_0001.xsd, 0002.xsd and 0003.xsd) to validate each test result (e.g., response_GetBalanceInquiry_0001.xml, 0002.xml and 0003.xml).

The test type selector 300 may include an invoke button 320 that the tester may activate in order to initiate execution of the selected test cases. The test type selector 300 may include a return button 322 that a tester may activate in order to navigate to the test object selection interface 100. The test type selector 300 may include a reset button 324 that a tester may activate in order to reset the selections made on the test type selector 300.

The test type selector 300 may include a add test button 326 that the tester may activate in order to add a test to a massive test for the massive test 306 mode selection, discuss further below. In one implementation, the test type selector 300 presents a test name and location specifier field 328 when the tester activates the add test button 326 so that the tester may enter the project area structure source location and name of a test to be added to a list of tests. The project area management logic adds the test to the project area (e.g., copies the test to a destination project area structure location).

In one implementation, when the tester and/or administrator activates the add test button 326, the GUI logic presents a test object creation interface. The test object creation interface may be similar to the test object selection interface 100 as to the object selection fields presented, but the test object creation interface allows the tester and/or administrator to enter values that the GUI logic specifies to the project area management logic. The project area management logic uses the values to establish a project in one of the project areas 604, a test environment in one of the test environment areas 606, a web service in one of the web service areas 608, and a method in one of the web service method areas 610. The test object creation interface allows the tester to copy existing project areas, test environment areas, web service areas and web service method areas and the objects within those areas into other areas of the project area structure so that the tester may reused and/or customized areas and objects as needed.

The type test byte-to-byte 308 type test selector specifies whether the tester desires the test execution system to perform a byte-to-byte comparison of the test results (e.g., response message) produced by a WSDL file in response to a test (e.g., request message). For example, the test execution system may compare a response message XML file byte-to-byte against a previously validated response message XML file produced by a XSD schema file. The type test byte-to-byte 308 provides a higher level of validation, beyond merely analyzing test result values and test output.

The type test schema XSD 310 type test selector specifies whether the tester desires the test execution system to compare the test results (e.g., response message) produced by a WSDL file of a web service in response to a test (e.g., request message) to a previously validated response (e.g., response message XML file) produced using a XSD schema file. For example, a tester may produce a model response XML file using a validated XSD schema file and store the model response XML file in the project area structure for comparison against a response file produced by the WSDL file in response to a test (e.g., request message). The type test schema XSD 310 provides information a tester may use to quickly pinpointing specific differences between a test result (e.g., response message produced by the WSDL in response to a test) and model response (e.g., a response message produced using a validated XSD schema file).

Figure 4:
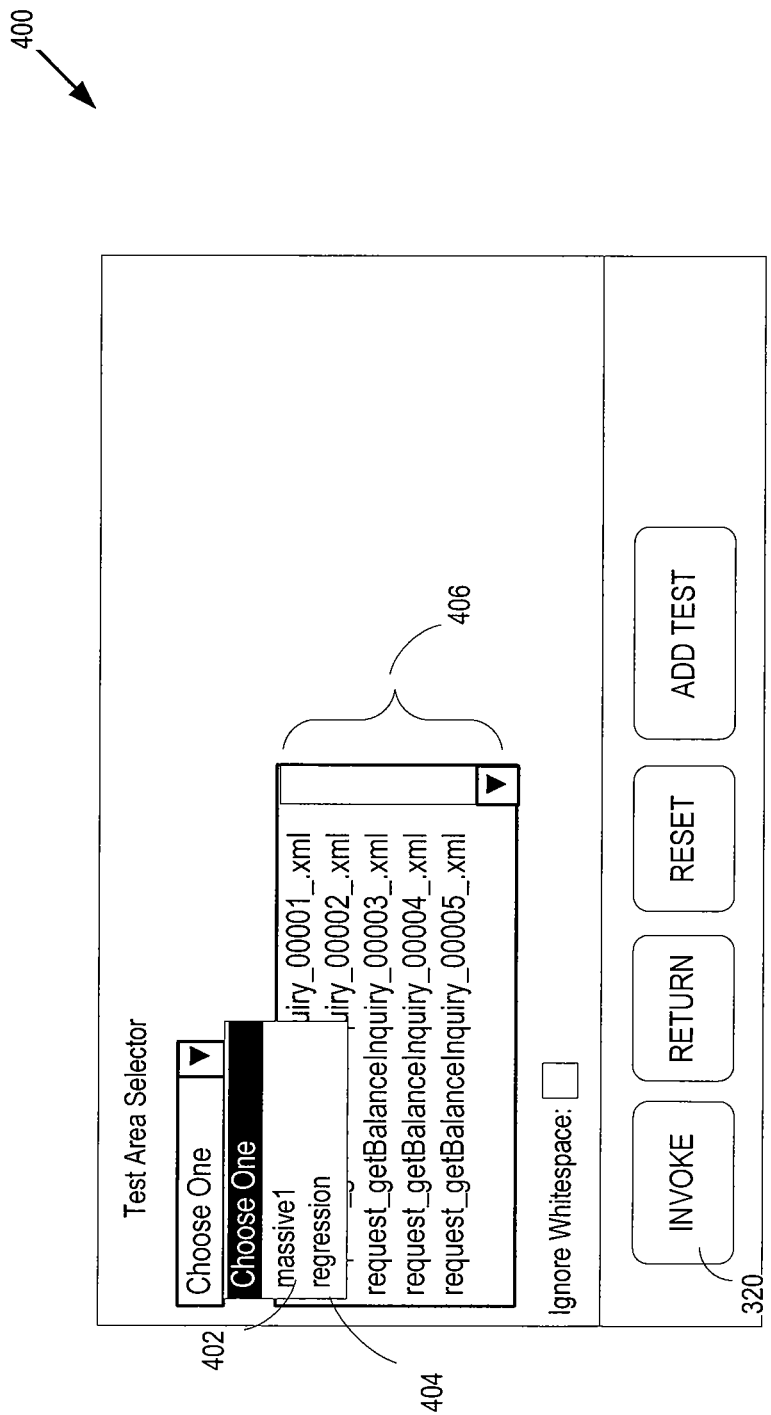
FIG. 4 illustrates the massive test and regression test mode selector presented by the test type selector.

FIG. 4 illustrates the massive test and regression test mode selector presented by the test type selector 300. In the event a tester selects the massive test 306 mode from the test type selector 300, the test type selector 300 further presents a test area selector 400 that includes test area selections (e.g., massive1 402 and regression 404). The test area selections represent test areas that include test cases 406 (e.g., request messages) for the web service method selected using the method selector 108. In the event the tester depresses the invoke button 320, the test execution system initiates execution of the test cases 406. Under a massive test (e.g., 402) the test execution system executes all the tests within and/or referred to by a massive test area. A regression test (e.g., 404) may refer to a regression test area that includes and/or refers to multiple massive test areas (e.g., massive test area 1 and massive test area 2) and test execution system executes all the tests within and/or referred to by each of the massive test areas within and/or referred to by the regression test area.

Figure 5:
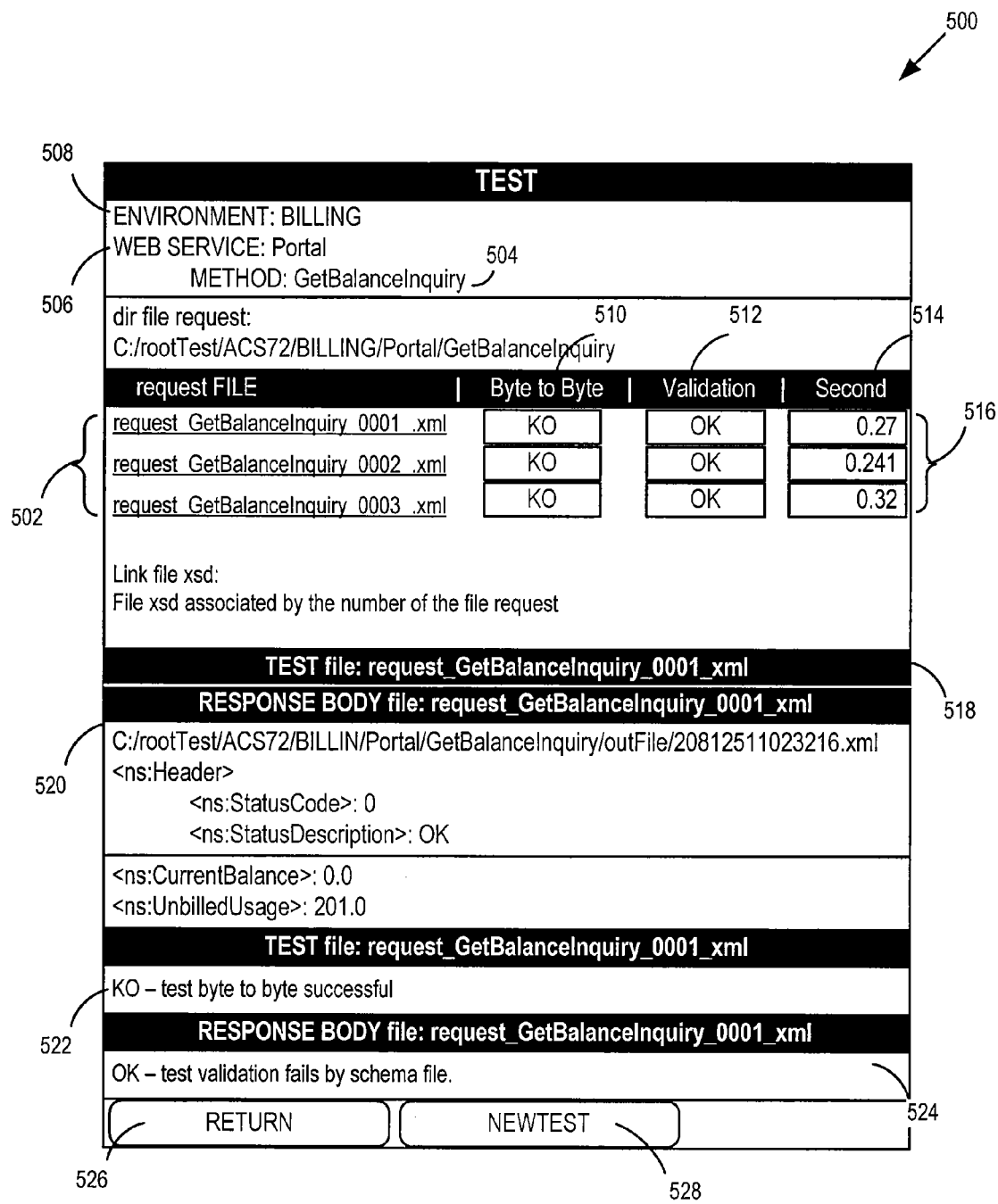
FIG. 5 illustrates a method test result produced by the execution of multiple tests of a web service method.

FIG. 5 illustrates a method test result 500 produced by the execution of multiple test cases 502 (e.g., request messages) of a web service method 504 (e.g., GetBalanceInquiry). The method test result 500 may identify the web service 506 and test environment 508, the web service method 504 that identify the location within the project area structure of the tests for the web service method 504. The method test result 500 may further identify the test results for each type of test performed (e.g., byte to byte test result 510, validation 512 using XSD schema, and execution time 514 (e.g., expressed in seconds). The execution times (e.g., 516) for each test case 502 may provide performance information a tester may use to identify performance bottlenecks. The method test result 500 identifies the test file name 518, response body of the test file 520, a description of the test byte to byte file test results 522, and a description of the test validation by XSD schema file test results 524. The method test result 500 may include a return button 526 that the tester may depress in order to return to the test type selector 300. The method test result 500 may also include a new test button 528 that the tester may depress in order to modify the current test type selector 300 selections so that a new test may be executed. In one implementation, the return button 526 may re-initiate execution of the currently selected test(s) selected using the test type selector 300. Similar test results may be produced for each mode and type of test selected using the test type selector 300 (e.g., a full web service test result, an environment test result and a project area test result).

Figure 6:
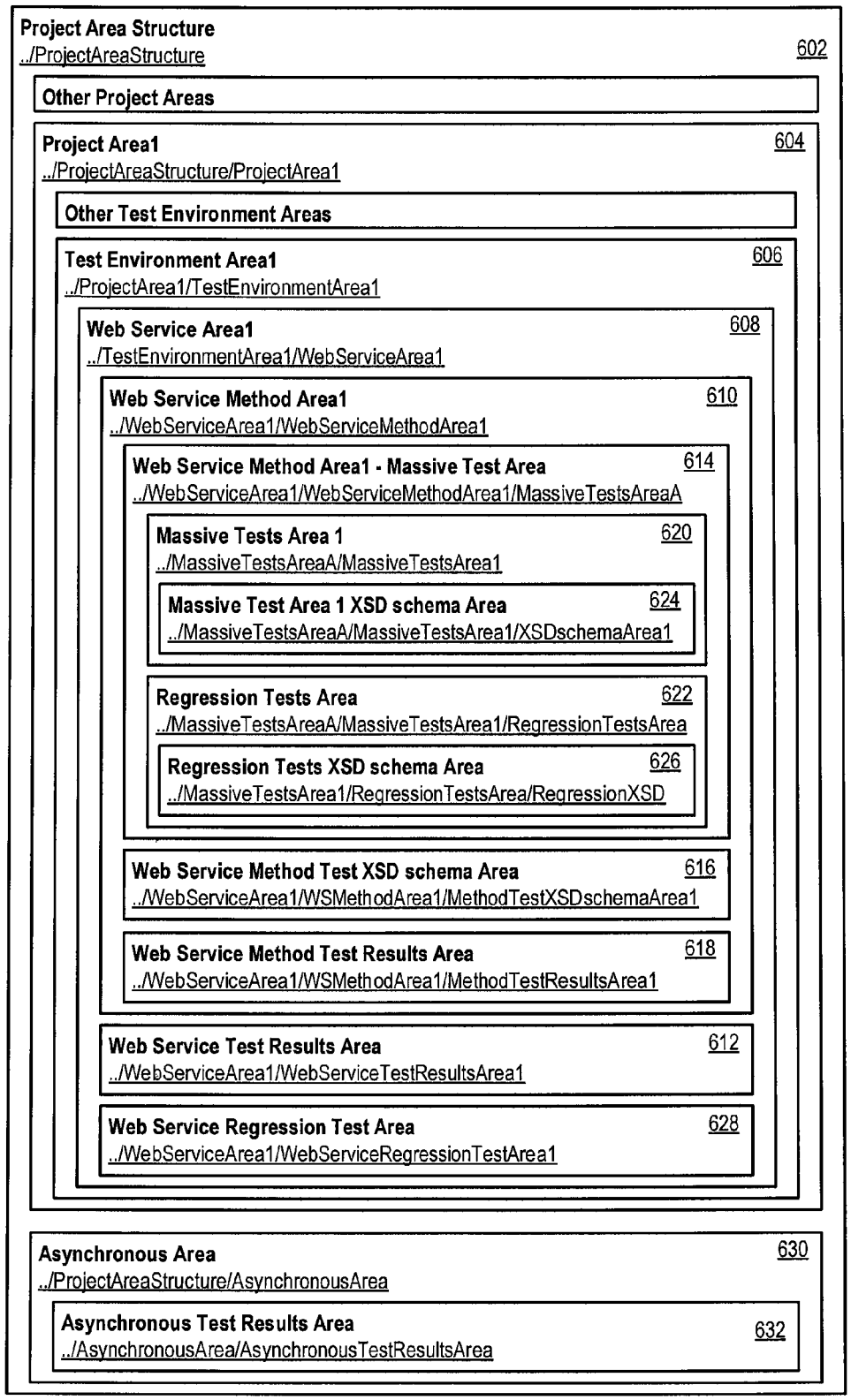
FIG. 6 illustrates one implementation of the standardized project area specification of the test execution system.

FIG. 6 illustrates one implementation of the standardized project area specification 600 of the test execution system. The standardized project area specification 600 specifies at least one project area structure 602, although multiple project area structures may be specified based on the scope and complexity of testing. In one implementation, the standardized project area specification 600 is a XSD file that includes a series of rules and constraints that model the standardized test directory naming convention and standardized test file naming convention. The project area structure may be implemented as one or more XML files that represent areas and objects (e.g., test files) of the project area structure according to the XSD schema file for the standardized project area specification 600. For example, the XML files may define a standardized project area specification that includes a hierarchy of element tags for each level in the project area structure with a text string and directory separators that specify where in a file system (e.g., storage system) the related objects are located for that level in the project area structure.

A project area structure may include multiple project areas (e.g., project area 604). The project areas may include multiple test environment areas (e.g., test environment area 606). Each test environment area may represent various business processes, applications and/or systems (e.g., billing, customer service and marketing) for which a developer may develop web services. The test environment areas in turn may include multiple web service areas (e.g., web service area 608) that include multiple web service method areas (e.g., a web service method area 610) for each of the web service methods of a web service identified a web service area. The test execution system may store a WSDL filename (e.g., CreateCustomer.wsdl) that describes the web service and how to access the web service identified by the web service area 606. In one implementation, the web service area 606 includes a web service test results area 612. The project area structure 602 may comprise multiple projects areas (e.g., a first project area and a second project area), test environment areas (e.g., a first test environment and a second test environment), web service areas (e.g., a first web service area, a second web service area and a third web service area) and web service method areas (e.g., a first web service method areas, a second web service method areas and a third web service method areas), as well as other logical components and subcomponents that conform to the standardize project area specification.

A web service method area 610 includes request messages (e.g., request_getBalanceInquiry_000X.xml) and each byte to byte test file (e.g., test_getBalanceInquiry.xml) that represent test cases that the test execution system may use to test a web service method. In one implementation, each web service method area includes: 1) a massive test area 614 that includes massive tests (e.g., XML request messages that represent multiple test cases); 2) a web service method test XSD schema area 616 that includes XSD schema files (e.g., request_getBalanceInquiry_000X.xsd) that the test execution system may use to validate tests (e.g., response_getBalanceInquiry_000X.xml) for a particular web service method; and 3) a method test results area 618 that includes response files (e.g., TestResultsID_request_getBalanceInquiry_000X.xml) for the tests performed on the web service method and test results files (e.g., TestResultsID_request_getBalanceInquiry_000X.txt).

In one implementation, a massive test area 614 includes sub-massive test areas (e.g., massive test area 1 620 and massive test area 2) and a web service method regression test area 622. A sub-massive test area 620 may include multiple tests used to test a web service method. In one implementation, each sub-massive test area is populated with different combinations of tests to establish distinct tests cases that represent complex processing scenarios (e.g., use cases). The sub-massive test area 620 and regression test area each include a XSD schema area (e.g., 624 and 626) and request messages (e.g., XML files) representative of different tests available to the test execution system. The web service method regression test area 622 may include a duplicate of each of the sub-massive test areas (e.g., massive test area 1 620 and massive test area 2).

The web service area 608 may further include a web service regression test area 628 the contents of which the test execution system uses to initiate execution of tests on the methods of the web service 106 when the full web service test selector 112 is selected. The web service regression test area 628 may include, duplicate and/or refer to each of the web service method regression test areas (e.g., 622) of the web service methods for the web service 106. The test execution system initiates execution of the regression tests for the methods of the web service when the full web service test selector 112 is selected. In one implementation, the project area management logic locates the web service regression area 628 populated with a full web service test object for the web service 106 when the full web service test selector 112 is selected. The full web service test object may represent of the aggregation of all the method test objects for all the web service method tests for a particular web service.

The test execution system may store test results and validation files (e.g., timestamp_testfile.txt, XML response files, XSD schema files used to validate the response messages, and the results and description of the results) in the test results area. The timestamp may specify the test execution time for a test to any desired level of accuracy. In one implementation, the timestamp prefix of the test results file is formatted to indicate the year, month, hour, day, minute, second and millisecond that the test execution system executed a test. For example, 20081008113401687_testfile.txt may indicate that the test was executed Oct. 8, 2008 at 11:34:01:687.

In one implementation, the project areas structure 602 includes an asynchronous test area 630 populated with test cases that the test execution system executes when the asynchronous test selector 110 is selected. The asynchronous test area 630 may include test cases (e.g., timestamp_asynchronous_000X.xml) used to test different web services and web service methods for different project areas and/or test environment areas. The asynchronous test area 630 may include an asynchronous test results area 632 that the test execution system uses to store test results and validation files (e.g., timestamp_asynchronous_000X.txt, XML response files, XSD schema files used to validate response messages, and the results and description of the results).

The GUI logic presents object selectors that allow the tester to execute web service method tests across project areas, test environments and web service areas. For example, the asynchronous test area 630 may be populated with a first asynchronous test object and a second asynchronous test object. The first asynchronous test object may represent multiple method selections for web service method tests that test the methods of a first web service and a second web service, respectively. The project areas of the project area structure may include a first project area 604 and the second project area. The first project area 604 and the second project area may include web service areas for the first web service and a second web service, respectively. The first project area 604 may include the first test environment area 606 and a second test environment area, the first test environment area 606 and the second test environment area may include web service areas for the first web service and a third web service, respectively. The second asynchronous test object may represent multiple method selections for web service method tests that test the methods of the first web service and the third web service.

Figure 10:
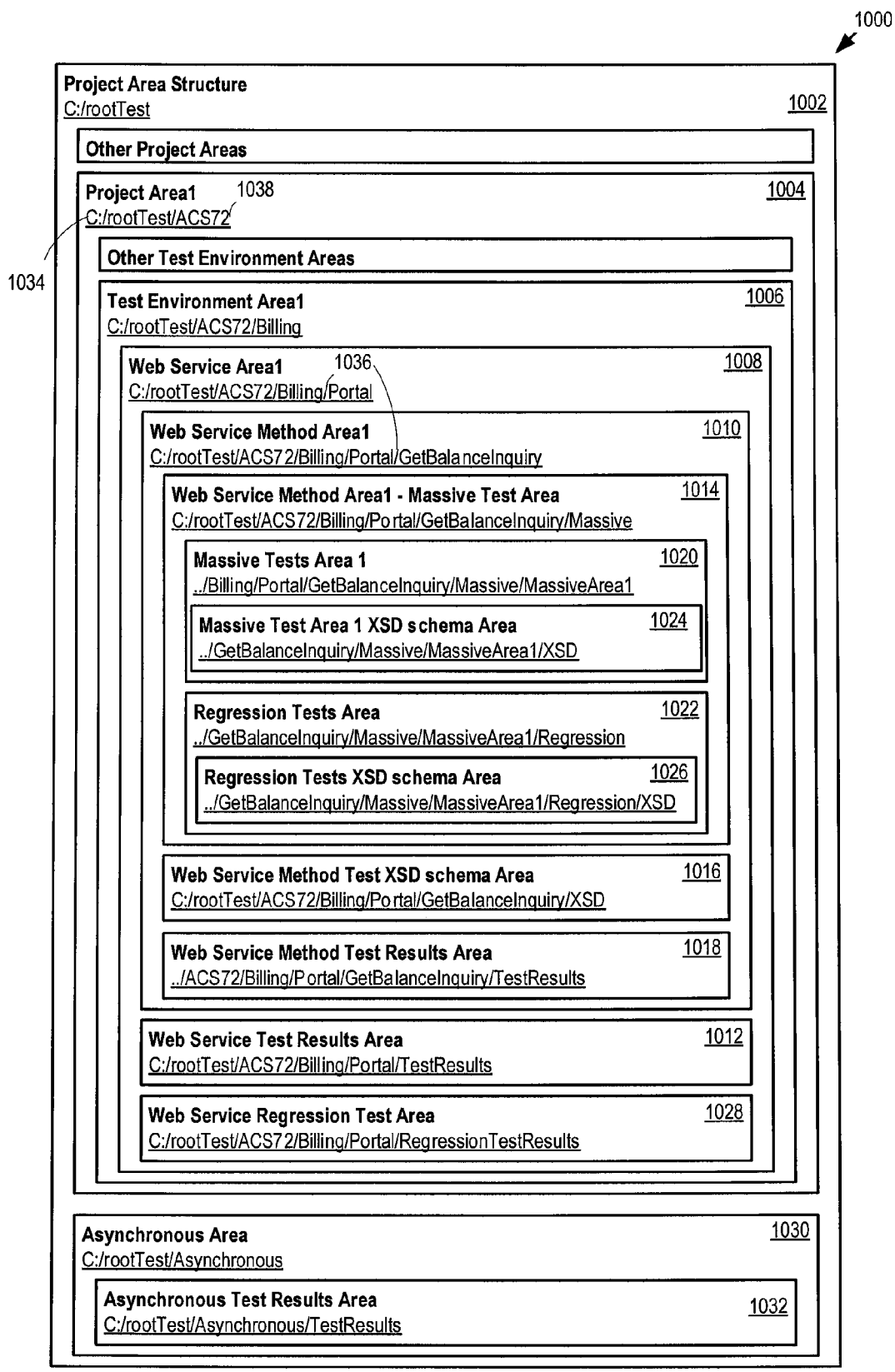
FIG. 10 illustrates another implementation of the standardized project area specification of the test execution system.

Referring briefly to FIG. 10, the standardized project area specification 1000 illustrates an implementation of a standardized test directory naming convention and standardized test file naming convention. The standardized test directory naming convention may specify logical and/or physical storage identifiers (e.g., 'C:' 1034 and 'http:/123.45.678.123'), directory separators (e.g., '/' slash character 1036) and text strings (e.g., 1038) to identify the areas of a project area structure. In one implementation, the standardized test directory naming convention specifies that the project area structure 1002 is the root directory path (e.g., "C:/rootTest") where the project areas within the project area structure 1002 are located. The standardized test directory naming convention specifies that the directory path for a project area 1004 (e.g., "C:/rootTest/ACS72") may include the name of the project (e.g., ACS72), the directory path for a test environment area 1006 (e.g., "C:/rootTest/ACS72/Billing") includes the name of the test environment (e.g., Billing), the directory path for a web service area 1008 (e.g., "C:/rootTest/ACS72/Billing/Portal") includes the name of the web service (e.g., Portal), the directory path for a web service method area 1010 (e.g., "C:/rootTest/ACS72/Billing/Portal/GetBalanceInquiry") includes the name of the method (e.g., GetBalanceInquiry).

The standardized project area specification 1000 specifies that web service areas and web service method areas each may include XSD schema areas name XSD. The standardized test directory naming convention specifies that the directory path for a XSD schema area 1016 (e.g., "C:/rootTest/ACS72/Billing/Portal/GetBalanceInquiry/XSD") for a web service method area includes the name of the web service (e.g., GetBalanceInquiry) and the XSD identifier. The standardized test directory naming convention specifies that the directory path for a XSD schema area (e.g., "C:/rootTest/ACS72/Billing/Portal/XSD") for a web service area includes the name of the web service (e.g., Portal) and the XSD identifier.

The standardized project area specification 1000 specifies that project areas, test environment areas, web service areas and web service method areas each may include a massive test area that includes a regression test area named 'Regression'. In one implementation, a massive test area includes, in addition to a regression test area, multiple sub-massive test areas. The standardized test directory naming convention specifies that the directory path for a massive test area may include the 'Massive' identifier at the end of the directory path of the area where the massive test area is located. For example, the directory path name for a massive test area may be "C:/rootTest/ACS72/Massive" for a project area named ACS72, "C:/rootTest/ACS72/Billing/Massive" for a test environment area named Billing, "C:/rootTest/ACS72/Billing/Portal/Massive" for a web service area named Portal, and "C:/rootTest/ACS72/Billing/Portal/GetBalanceInquiry/Massive" for a web service method area named GetBalanceInquiry. The standardized test directory naming convention specifies that the directory path for a regression test area within a massive test area includes the 'Regression' identifier at the end of the directory path for the massive test area directory path where the regression test area may be located. For example, the directory path name for a regression test area may be "C:/rootTest/ACS72/Massive/Regression" for a project area named ACS72, "C:/rootTest/ACS72/Billing/Massive/Regression" for a test environment area named Billing, "C:/rootTest/ACS72/Billing/Portal/Massive/Regression" for a web service area named Portal, and "C:/rootTest/ACS72/Billing/Portal/GetBalanceInquiry/Massive/Regression" for a web service method area named GetBalanceInquiry.

The standardized project area specification 1000 specifies that the project area structure may include an asynchronous test area named 'Asynchronous'. The standardized test directory naming convention specifies that the directory path for an asynchronous test area 1030 (e.g., "C:/rootTest/Asynchronous") may include the identifier 'Asynchronous'.

The standardized project area specification 1000 specifies that the project areas, test environment areas, web service areas, web service method areas, massive test areas, sub-massive test areas, asynchronous test areas and regression test areas each may include a test results areas named 'TestResults'. The standardized test directory naming convention specifies that the directory path for a test results area may include the 'TestResults' identifier at the end of the directory path of the area where the test results area is located. For example, the directory path name for a test results area may be "C:/rootTest/ACS72/TestResults" for a project area named ACS72, "C:/rootTest/Asynchronous/TestResults" for a asynchronous test area, "C:/rootTest/ACS72/Billing/TestResults" for a test environment area named Billing, "C:/rootTest/ACS72/Billing/Portal/TestResults" for a web service area named Portal, and "C:/rootTest/ACS72/Billing/Portal/GetBalanceInquiry/TestResults" for a web service method area named GetBalanceInquiry.

In one implementation, the standardized test file naming convention specifies that the name of test files (e.g., XML files such as Context_MethodName_000X.xml) include the name of the web service method (e.g., GetBalanceInquiry) that the XSD schema file validates, a prefix that identifies the context in which the test file is used (e.g., response and request), a numerical identifier (e.g., 000X) that uniquely identifies each test file in a series of test files, and the file extension (e.g., xml). For example, the request_GetBalanceInquiry_000X.xml file identifies the test file as a request message file used in the context of a web service in the role of a service provider. In another example, the response_GetBalanceInquiry_000X.xml file identifies the test file as a response message file used in the context of a web service in the role of a service requester. The test files (e.g., request messages and response messages) may be considered instances of their XSD schemas and the XSD schema files are identified by the xsd extension. The WSDL files (e.g., WebServiceName.wsdl) describe the web services and how to access the web services of the application to be tested using the test execution system. Test results may be output to files of any number of formats including text and XML with file extensions txt and xml, respectively.

The standardized test directory naming convention and standardized test file naming convention specified by the standardized project area specification 1000 specifies provides an effective management tool for testing web service based applications. The standardized project area specification 1000 makes the tests within the project area structure 602 easily locatable and manageable, so that tests even become reusable and deployable across the project area structure 1002 with the test execution system. The standardized project area specification 1000 provides testers a logical way to organize tests, results and validation files so that testers can rapidly produce high quality web services based applications.

Figure 7:
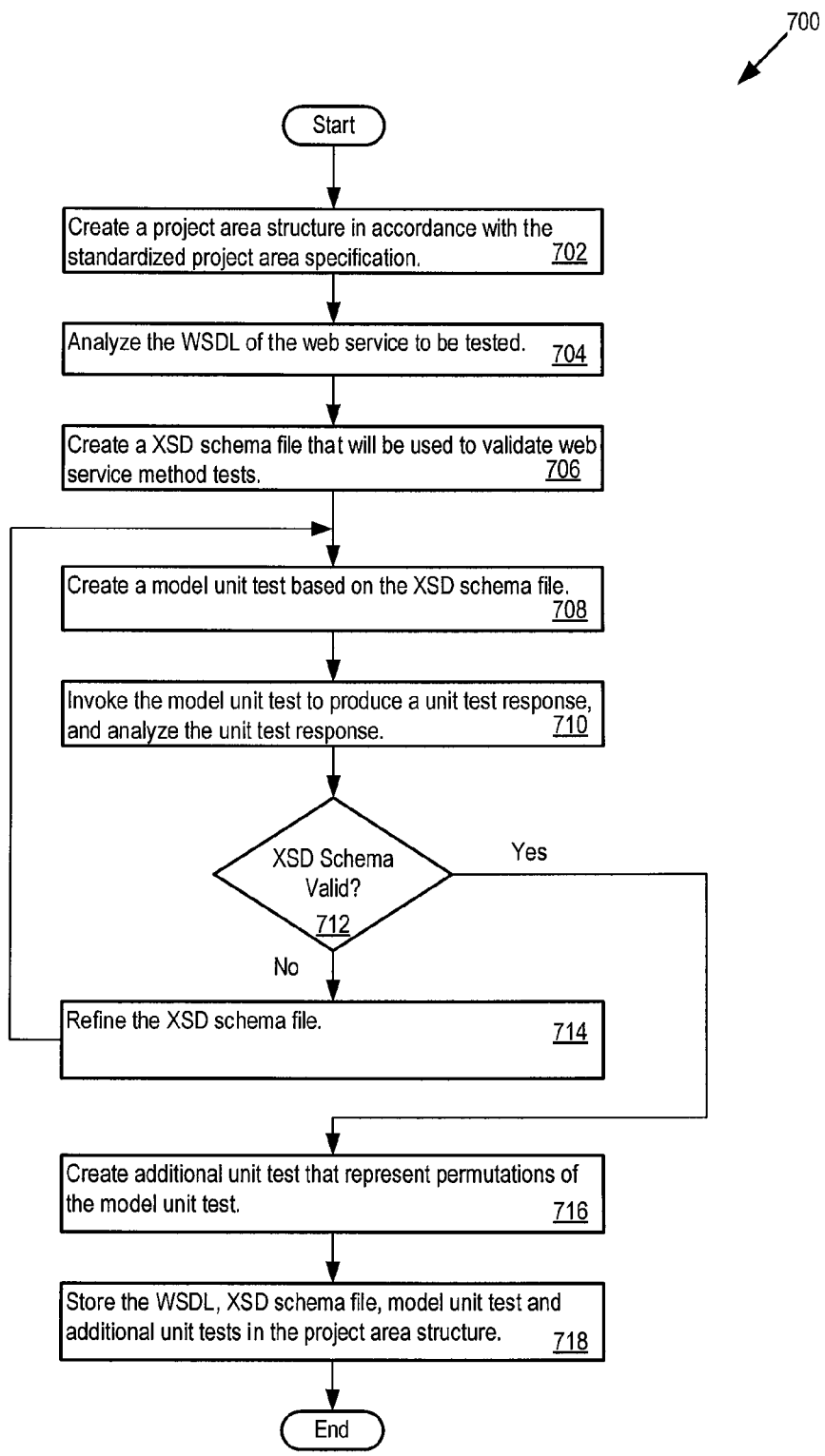
FIG. 7 shows the logic flow that may be used to pre-configure the project area structure and test execution system.

FIG. 7 shows the logic flow 700 that may be used to pre-configure the project area structure 602 and test execution system. The tester, test execution system administrator, or a project area creation program may analyze (e.g., parse) the WSDL file of each web service of an application and automatically create a project area in the project area structure in accordance with the standardized project area specification 1000 (702). For example, the project area creation program may generate a hierarchical directory structure matching the standardized project area specification captured in an XML file. The tester analyzes the WSDL file of a web service that the tester intends to test (704) and creates a XSD schema file that defines a valid request message and/or response message used to communicate with a web service method of the web service (706). The tester creates a model unit test (e.g., a request message) using the XSD schema file and names the model unit test in accordance with the standardized project area specification (708).

The tester invokes the model unit test (e.g., a request message) to communicate with the web service method to produce a unit test response (710) and analyzes the model response to validate the XSD schema file (712). The tester refines the XSD schema file until the model unit test produces a model unit test response (714). For example, the tester may verify the XSD schema files and build tests using available XML development tools (e.g., XmlSpy). The tester may use an available XML development tool to create a model request messages (e.g., schema_methodName_000x.xml) based on the created XSD schema file (e.g., schema_methodName_000x.xsd). The tester uses the request message to invoke the web service method of the WSDL and the WSDL produces a response to the request message that the tester analyzes and uses to validate the request message created by the XML development tool and thereby validate the XSD schema file.

The tester may use the model unit test to create any number of additional unit tests that represent permutations of the model unit test (716) by modifying various aspects of the model unit test (e.g., the request message file). The tester stores the WSDL file, XSD schema file, model unit test and additional unit tests in the project area structure in accordance with the standardized project area specification (718).

Figure 8:
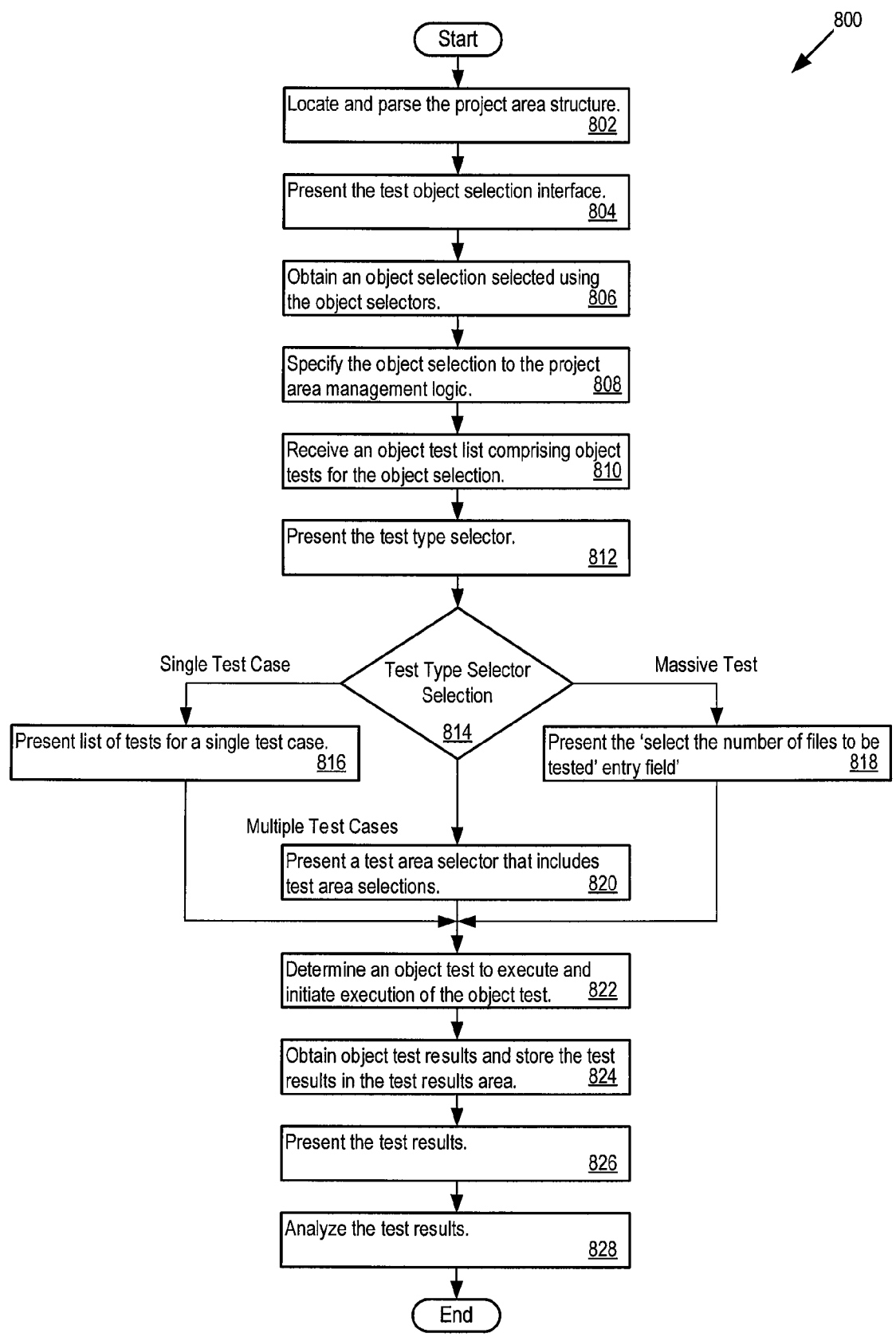
FIG. 8 shows the logic flow that may be used to navigate the project area structure to initiate execution of a test using the test object selection interface.

FIG. 8 shows the logic flow 800 that may be used to navigate the project area structure 602 to initiate execution of a test using the test object selection interface 100. The project area management logic of the test execution system locates the project area structure 602 (e.g., a XML file that includes the project area structure 602) on the storage system (802), parses the project area structure 602 to determine project areas within the project area structure 602, test environment areas within the project areas, web service areas within the test environment areas, and web service method areas within the web service areas.

For example, referring back to FIG. 6, the project area structure 602 may be a XML file that the project area management logic validates against the standardized project area specification 1000 implemented as an XSD schema file. The standardized project area specification 1000 specifies the standardized test directory naming convention and standardized test file naming convention that the project area management logic uses to navigate the project area structure 602 and locate areas and objects (e.g., files) accordingly. In one implementation, the project area management logic is a web service called to locate areas and objects (e.g., XML files) of the project area structure 602 and parse (e.g., navigate and/or traverse) the XML files that represent the areas and objects of the project area structure 602.

In one implementation, the project area management logic uses the standardized project area specification 1000 implemented as an XSD schema file and the WSDL files of web services targeted for testing and XSD schema files for the web service methods for the target web services to automatically generate the project area structure 602. Because the WSDL files of web services include the information used to generate XSD schema files that validate web service methods, and because the standardized project area specification 1000 as an XSD schema file may validate a project area structure conforming to the standardized test directory naming convention and standardized test file naming convention specified by the standardized project area specification 1000, the project management logic may use these WSDL and XSD schema files to generate an initial project area structure and/or update an existing project area structure.

Returning to FIG. 8, in one implementation, the GUI logic presents the test object selection interface 100 to the tester (804). The test object selection interface 100 comprises object selectors, including: a project area selector populated with project areas; a test environment selector populated with the test environment areas; a web service selector populated with the web service areas; and a method selector populated with the web service method areas. The GUI logic obtains an object selection selected using the object selectors (806) (e.g., a method selection), and specifies the object selection to the project area management logic (808), and receives in response an object test list comprising object tests for the object selection (e.g., a method test list comprising individual method tests for the method selection) (810). The object selection may represent any combination of selections from the object selectors.

The test object selection interface 100 presents the test type selector 300 based on the object selection and/or combination of selections from the object selectors (812). The tester selects a test type selection from the test type selector (814). In the event a tester selects the single test 302 mode, the test type selector 300 presents a list of tests 314 (e.g., request messages) from which the tester may select a single test case to execute (816). In the event the tester selects the multiple test 304 mode selector, the test type selector 300 may present the 'select the number of the files to be tested' entry field 312 and tests 314 (818). In the event a tester selects the massive test 306 mode from the test type selector 300, the test type selector 300 further presents a test area selector 400 that includes test area selections (e.g., massive1 402 and regression 404) (820).

The GUI logic determines an object test (e.g., method test) to execute and initiates execution of the object test (822) to obtain object test results (e.g., obtain method test results) that the test execution system stores in a test results area within the project area structure (824). The GUI logic presents the test results (826) to the tester and the tester analyzes the test results (828). The tester may modify the object selection and/or test type selector 300 selections based on the test results in order to execute a new test.

Figure 9:
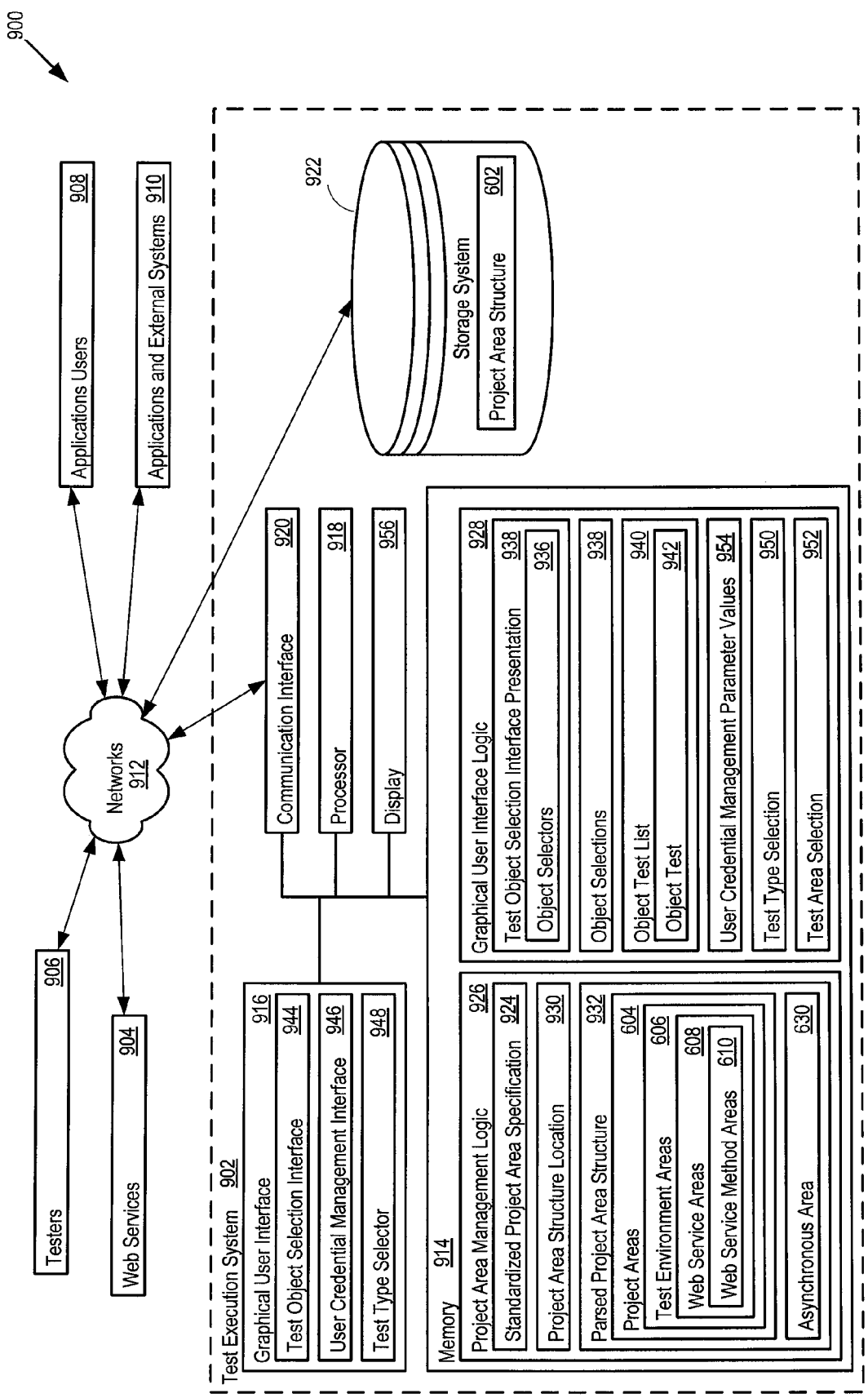
FIG. 9 illustrates a test execution system configuration.

FIG. 9 illustrates a test execution system configuration 900. The test execution system configuration 900 may include: the test execution system 902; web services 904; testers 906; applications users 908; and applications and external systems 910; and a network 912 (e.g., the Internet) used for communication between the various components. The test execution system 902 includes a memory 914, a display 956 that displays the graphical user interface 916, a processor 918 coupled to the memory 914, and a communications interface 920 used to communicate with the various components of the test execution system 902 and the other entities in the test execution system configuration 900. The test execution system 902 further includes a storage system 922 adhering to the standardized project area specification 924 for the project area structure 602. The standardized project area specification 924 is stored in the storage system and includes a standardized test directory naming convention and a standardized test file naming convention.

The memory 914 includes the project area management logic 926 and GUI logic 928. The project area management logic 926 uses the standardized project area specification 924 to navigate and manage the project area structure 602 and validate the areas and objects (e.g., project areas, test environment areas, web service areas, web service method areas, tests and test files) stored and/or created in and/or referred to by the project area structure 602. The project area management logic 926 maintains the project area structure location 930 information and uses the project area structure location 930 information to respond to object selections specified by the GUI logic 928. The project area management logic 926 parses the project area structure 932 and the various components of the parsed project area structure 932 (e.g., 602, 604, 608, 610, and 630).

The GUI logic 928 generates a test object selection interface presentation 934 and object selectors 936 (e.g., a project area selector 102, a test environment selector 104, a web service selector 106, a method selector 108, asynchronous test selector 110, and a full web service test selector 112). The GUI logic 928 is responsive to object selections 938 selected by the tester by obtaining the selections and specifying the object selections 938 to the project area management logic 926. The GUI logic 928 receives an object test list 940 comprising object tests 942 for the object selection 938 (e.g., a method test list comprising individual method tests for the method selection).

The graphical user interface 916 of the test execution system includes the test object selection interface 944, user credential management interface 946 and test type selector 948. The GUI logic 928 is responsive to a test type selection 950 and a test area selection 952 selected using the test type selector 948 and test object selection interface 944, respectively. The GUI logic 928 is further responsive to the credential management parameter values 954 entered by a tester through the user credential management interface 946.

The systems may be implemented in many different ways. For example, although some features are shown as computer program products embodied as a signal or data stream and/or stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The systems may be implemented in software, hardware, or a combination of software and hardware. The files, schemas, and messages used by the systems may employ formats that are different from the formats described above.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analogue or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A test execution system for a service oriented architecture comprising:
  a storage system adhering to a standardized project area specification for a project area structure, the standardized project area specification comprising:
  a standardized test directory naming convention; and
  a standardized test file naming convention; and
  a memory comprising:
    project area management logic operable to:
      locate the project area structure on the storage system;
      parse the project area structure to determine:
        project areas within the project area structure;
        test environment areas within the project areas;
        web service areas within the test environment areas; and
        web service method areas within the web service areas;
    graphical user interface (GUI) logic operable to:
      present a test object selection interface comprising object selectors including:
        a test environment selector populated with the test environment areas;
        a web service selector populated with the web service areas; and
        a method selector populated with the web service method areas;
      obtain an object selection selected using the object selectors;
      specify the object selection to the project area management logic and receive in response an object test list comprising object tests for the object selection;
      create a test case by:
        analyzing an access model that describes how to access the object selection to test;
        creating a model schema that defines a model request message and model test response for the object selection; and
        generating the test case using the model schema;
      invoke the test case for the object selection;
      receive a unit test response by invoking the test case;
      compare the unit test response to the model test response to determine whether the unit test response validates the test case as an XSD schema file, and add the XSD schema file to the object test list when the unit test response test case validates the test case as the XSD schema file; and a processor coupled to the memory and the storage system and operable to execute the project area management logic and the GUI logic;

wherein the object selectors further include an asynchronous test selector populated with a first asynchronous test object and a second asynchronous test object, wherein the first asynchronous test object represents multiple method selections for web service method tests that test the methods of a first web service and a second web service of a first project area and a second project area, respectively, wherein the project areas comprise the first project area and the second project area, respectively, wherein the first project area comprises a first test environment area and a second test environment area, wherein the first test environment area and the second test environment area comprise web service areas for the first web service and a third web service, respectively; and wherein the second asynchronous test object represents multiple method selections for web service method tests that test methods of the first web service and the third web service.

2. The system of claim 1, wherein the object selection obtained using the object selectors comprises a method selection from the method selector, and the object test list received in response to the method selection comprises a method test list comprising individual method tests for the method selection.

3. The system of claim 1, wherein the second asynchronous test object further represents multiple method selections for the web service method tests comprising asynchronous tests that when invoked test the methods of the first web service and the third web service asynchronously.

4. The system of claim 1, wherein the object selectors further include a full web service test selector populated with a full web service test object, wherein the full web service test object represents multiple method selections that represent respective web service method tests that test the methods of a first web service.

5. The system of claim 1, wherein the GUI logic is responsive to the object selection by obtaining the selection and further operable to present a user credential management interface, the user credential management interface comprising: an IP address parameter; a username parameter; and a password parameter.

6. The system of claim 1, the project area management logic further operable to establish a project in one of the project areas, a test environment in one of the test environment areas, a web service in one of the web service areas, and a method in one of the web service method areas.

7. The system of claim 1, the test object selection interface further comprising: an add test menu selector that identifies an additional object test to add to the object test list; and a delete test menu selector that identifies deletable object test selections to delete from the object test list.

8. The system of claim 1, wherein the GUI logic is responsive to the object selection so that when the object selection comprises a test environment selection from the test environment selector, a web service selection from the web service selector and a method selection from the method selector then the GUI logic presents a test type selector comprising:

a single test selector, wherein the GUI logic presents the object test list from which a single object test is selectable for execution;

a multiple test selector, wherein the GUI logic presents a selector entry field operable to receive one or more numbers corresponding to one or more object tests to be tested and display the applicable tests; and a massive test selector, wherein the GUI logic presents a test area selector comprising test area selections comprising a massive test area selector and a regression test area selector for selection.

9. A product for test data creation and test execution for a service oriented architecture, the product comprising:

a non-transitory machine-readable medium having logic stored thereon comprising:

project area management logic operable to:

store and locate a project area structure on a storage system, the project area structure in accordance with a standardized project area specification, the standardized project area specification comprising:

a standardized test directory naming convention; and a standardized test file naming convention;

parse the project area structure to determine:

project areas within the project area structure;

test environment areas within the project areas;

web service areas within the test environment areas; and web service method areas within the web service areas; and graphical user interface (GUI) logic operable to:

present a test object selection interface comprising object selectors including:

a project area selector populated with the project areas;

a test environment selector populated with the test environment areas;

a web service selector populated with the web service areas; and a method selector populated with the web service method areas;

obtain an object selection selected using the object selectors;

specify the object selection to the project area management logic and receive in response an object test list comprising object tests for the object selection;

create a test case by analyzing a model that describes how to access the object selection to test, creating a model schema that defines a model request message and model test response for the object selection, generating the test case using the model schema;

invoke the test case for the object selection;

receive a unit test response; and compare the unit test response to a model test response determine whether the unit test response validates the test case as an XSD schema file, and add the XSD schema file to the object test list when the unit test response validates the test case as the XSD schema file, present the test object selection interface comprising the object selectors further comprising an asynchronous test selector populated with a first asynchronous test object and a second asynchronous test object, wherein the first asynchronous test object represents multiple method selections for web service method tests comprising asynchronous tests that when invoked test the methods of a first web service and a second web service, respectively, wherein a first project area and a second project area comprise the first web service and the second web service, respectively, and wherein the first project area further comprises a first test environment area and a second test environment area, the first test environment area and the second test environment area comprising web service areas for the first web service and a third web service, respectively; and wherein the second asynchronous test object represents multiple method selections for respective web service method tests that test methods of the first web service and the third web service.

10. The product of claim 9, wherein the object selection obtained using the object selectors is a method selection from the method selector, and the object test list received in response to the method selection is a method test list comprising individual method tests for the method selection.

11. The product of claim 9,
wherein the second asynchronous test object further represents multiple method selections for the respective web service method tests that test comprising asynchronous tests the methods of the first web service and the third web service asynchronously.

12. The product of claim 9, wherein the object selectors further include a full web service test selector populated with a full web service test object, wherein the full web service test object represents multiple method selections for respective web service method tests that test the methods of a first web service.

13. The product of claim 9, the project area management logic further operable to establish a project in one of the project areas, a test environment in one of the test environment areas, a web service in one of the web service areas, and a method in one of the web service method areas.

14. The product of claim 9, the test object selection interface further comprising: an add test menu selector that identifies an additional object test to add to the object test list; and a delete test menu selector that identifies a deletable object test to delete from the object test list.

15. The product of claim 9, wherein the GUI logic is responsive to the object selection so that when the object selection comprises a test environment selection from the test environment selector, a web service selection from the web service selector and a method selection from the method selector, the GUI logic presents a test type selector comprising:
 a single test selector, wherein the GUI logic presents the object test list from which a single object test is selectable for execution;
 a multiple test selector, wherein the GUI logic presents a selector entry field operable to receive one or more numbers corresponding to one or more object tests to be tested and display the applicable tests; and
 a massive test selector, wherein the GUI logic presents a test area selector comprising test area selections comprising a massive test area selector and a regression test area selector for selection.

16. A method for test data creation and execution for a service oriented architecture, the method comprising:
 storing a project area structure in a storage system adhering to a standardized project area specification for the project area structure, the standardized project area specification comprising:
  a standardized test directory naming convention;
  a standardized test file naming convention;
 locating the project area structure on the storage system;
 parsing the project area structure to determine:
  project areas within the project area structure;
  test environment areas within the project areas;
  web service areas within the test environment areas; and
  web service method areas within the web service areas;
 presenting a test object selection interface comprising object selectors:
  a test environment selector populated with the test environment areas;
  a web service selector populated with the web service areas; and
  a method selector populated with the web service method areas;
 obtaining an object selection selected using the object selectors;
 specifying the object selection to the project area management logic and receiving in response an object test list comprising object tests for the object selection;
 creating a test case by analyzing a model that describes how to access the object selection to test, creating a model schema that defines a model request message and model test response for the object selection, generating the test case using the model schema;
 invoking the test case for the object selection;
 receiving a unit test response; and
 comparing the unit test response to a model test response determine whether the unit test response validates the test case as an XSD schema file, and add the XSD schema file to the object test list when the unit test response validates the test case as the XSD schema file,
 presenting the test object selection interface comprising the object selectors further comprising an asynchronous test selector populated with a first asynchronous test object and a second asynchronous test object,
wherein the first asynchronous test object represents multiple method selections for respective web service method tests comprising asynchronous tests that when invoked test the methods of a first web service and a second web service, respectively,
wherein a first project area and a second project area, include the first and the second web service, respectively,
wherein the first project area further comprises a first test environment area and a second test environment area, the first test environment area and the second test environment area comprising web service areas for the first web service and a third web service, respectively; and
wherein the second asynchronous test object represents multiple method selections for respective web service method tests that test methods of the first web service and the third web service.

17. The method of claim 16, wherein obtaining the object selection obtains a method selection from the method selector, and wherein receiving the object test list in response to the method selection comprises receiving a method test list comprising individual method tests for the method selection.

18. The method of claim 16, further comprising obtaining the object selection comprising a test environment selection from the test environment selector, a web service selection from the web service selector and a method selection from the method selector, and presenting a test type selector comprising:
 a single test selector, wherein the GUI logic presents the object test list from which a single object test is selectable for execution;
 a multiple test selector, wherein the GUI logic presents a selector entry field operable to receive one or more numbers corresponding to one or more object tests to be tested and display the applicable tests; and a massive test selector, wherein the GUI logic presents a test area selector comprising test area selections comprising a massive test area selector and a regression test area selector for selection.

19. The method of claim 16, further comprising establishing a project in one of the project areas, a test environment in one of the test environment areas, a web service in one of the web service areas, and a method in one of the web service method areas:
   wherein the test object selection interface further comprises: an add test menu selector that identifies an additional object test to add to the object test list; and a delete test menu selector that identifies deletable object test selections to delete from the object test list.

20. The method of claim 16, presenting the test object selection interface comprising the object selectors further comprising a full web service test selector populated with a full web service test object, wherein the full web service test object represents multiple method selections for respective web service method tests that test the methods of a first web service.

\* \* \* \* \*